United States Patent Office 2,965,571
Patented Dec. 20, 1960

2,965,571
LUBRICANT COMPOSITION

James A. Wuellner, Gary, and Roger W. Watson, Highland, Ind., assignors to Standard Oil Company, Chicago, Ill., a corporation of Indiana No Drawing. Filed Apr. 30, 1957, Ser. No. 655,970

11 Claims. (Cl. 252—50)

This invention relates to improved lubricant compositions and more particularly it relates to hydrocarbon lubricants having improved viscosity-temperature characteristics.

It is well known that the viscosity of lubricating oils changes rapidly with changes in temperature, with different oils showing varying degrees of viscosity change as the temperature increases or decreases. The relationship between viscosity and temperature is commonly expressed in the art as the viscosity index (V.I.) of the oil. Oils which change little in viscosity with variations in temperature have a greater viscosity index than do oils whose viscosity is materially effected by changes in temperature. Thus, for example, highly paraffinic oils have, in general, higher viscosity indices than do naphthenic oils, indicating that the viscosity of a highly paraffinic oil does not change as rapidly and as greatly with changes in temperature as does the viscosity of a naphthenic oil. The viscosity-temperature characteristics of a lubricant which is used in applications where wide variations in temperature are encountered, such as in the lubrication of automotive and airplane engines, are of great importance and lubricant compositions having high viscosity indices are highly desirable.

It is an object of this invention to provide hydrocarbon lubricants having improved viscosity-temperature characteristics. Another object is to provide lubricating oil compositions whose viscosity changes little with changes in temperature. A further object of the invention is to provide hydrocarbon oil lubricant compositions having improved viscosity indices. Other objects and advantages of the invention will become apparent from the following description thereof.

In accordance with this invention, the above objects, among others, are achieved by incorporating in a hydrocarbon oil an oil-soluble graft copolymer, hereinafter described, in small but effective proportions to improve the viscosity-temperature characteristics of the oil. The copolymer which is used is a graft copolymer of (1) an acrylic monomer having the general formula

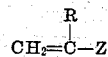

wherein R is selected from the group consisting of hydrogen and a methyl radical and Z is selected from the group consisting of a cyano (—CN) radical and an alkyl carboxy radical having the structure

wherein R' is selected from the group consisting of an alkyl radical having at least about 4 carbon atoms and a β-alkoxyalkyl radical having at least about 6 carbon atoms on (2) a copolymer of an ethlenically substituted aromatic compound selected from the group consisting of styrene, isopropyl styrene, and isopropyl-α-methylstyrene and an alkene selected from the group consisting of propylene and isobutylene, the molar ratio of the acrylic monomer, the substituted aromatic compound, and the alkene in the graft copolymer being within the range from about 1:1:1 to about 50:1:50. Examples of acrylic monomers suitable for use as graft monomers are acrylonitrile, butyl acrylate, hexyl acrylate, 2-ethylhexyl acrylate, octyl acrylate, nonyl acrylate, decyl acrylate, cetyl acrylate, heptyl methacrylate, 2-ethylhexyl methacrylate, lauryl methacrylate, butoxyethyl acrylate, β-butoxy propyl acrylate, etc.

In preparing the graft copolymer to be used in the lubricant compositions of this invention there is first prepared, in accordance with any usual or suitable procedure in the polymerization art, a copolymer (the "backbone" copolymer) of propylene or isobutylene with styrene, isopropyl styrene, or isopropyl-α-methylstyrene, onto which copolymer the acrylic monomer is then graft polymerized. The preferred aromatic compounds for use in forming the backbone copolymer are those which are ring-substituted with an isopropyl group, i.e., isopropyl styrene and isopropyl-α-methylstyrene. The isopropyl group may be in the ortho-, meta-, or para-position, although the meta- and particularly the para- substituted compounds are preferred, in order to avoid insofar as possible the effects of steric hindrance in the subsequent graft polymerization. The backbone copolymer can suitably be prepared by polymerizing a mixture of the alkene and the styrene or substituted-styrene at a temperature between about 0° F. and −100° F. in the presence of a Friedel-Crafts type of catalyst, such as $BF_3$, $AlCl_3$ and $AlBr_3$. The molar ratio of the alkene to styrene or substituted styrene in the copolymer can range from about 1:1 to about 50:1 but is preferably from about 5:1 to about 25:1. The polymerization is continued until the molecular weight of the backbone copolymer is within the range from about 5,000 to 75,000 and preferably from about 15,000 to 50,000.

Onto the backbone copolymer chain thus formed there is subsequently graft polymerized an acrylic monomer selected from the group consisting of acrylonitrile, alkyl esters of acrylic and/or methacrylic acids having at least about 4 (e.g., about 4 to 18), and preferably about 8 to 12 carbon atoms in the alkyl group, and esters of acrylic and/or methacrylic acids with a β-alkoxyalkyl alcohol wherein the alkoxy group contains at least 4 (e.g., about 4 to 18) and preferably about 8 to 12 carbon atoms and the alcohol contains a total of at least 6 (e.g., about 6 to 34), and preferably about 10 to 26 carbon atoms. Active centers on the backbone copolymer which act as sites for grafting of the acrylic monomer are formed by hydroperoxidation of the copolymer. The hydroperoxidation is accomplished by blowing the copolymer in solution in a suitable solvent such as benzene, toluene, n-hexane, etc., with oxygen or an oxygen-containing gas such as air at a temperature between about 70° F. and 300° F., and preferably between about 120° F. and 200° F. An organic peroxide or hydroperoxide, such as benzoyl peroxide or cumene hydroperoxide, may be present during the oxidation. As a result of this treatment hydroperoxide groups are formed at the tertiary carbon atoms in the copolymer. With a copolymer which contains styrene the hydroperoxide groups are formed at the tertiary α-carbon atoms of the styrene in the backbone chain. With copolymers which contain isopropyl-substituted styrenes, hydroperoxidation occurs preferentially at the tertiary carbon of the isopropyl group.

The graft polymerization of the acrylic monomer is accomplished by treating the copolymer hydroperoxide, produced as described above, with the acrylic monomer in the presence of a reducing agent such as a ferrous or cobaltous salt. The graft polymerization can be carried out in solution in a suitable solvent such as benzene, cyclopentane, cyclohexane, n-hexane, etc., or in aqueous emulsion using fatty acid soaps, such as sodium stearate and sodium oleate, as emulsifying agents. The relative proportions of the constituents of the graft copolymer are chosen such that the molar ratio of the acrylic monomer, the styrene or substituted-styrene, and the alkene in the final graft copolymer is within the range from about 1:1:1 to about 50:1:50, and preferably within the range from about 1:1:5 to 25:1:25. For use as an additive to improve the viscosity characteristics of a lubricating oil, the graft copolymer should, of course, be oil-soluble. Graft copolymers having molecular weights within the range of about 20,000 to 150,000, and preferably from about 40,000 to about 70,000, can be used in the present invention.

The graft copolymer is suitably employed in hydrocarbon oils in amounts of about 0.1% to 20% by weight and preferably about 1% to 15% by weight. The oil can be any hydrocarbon oil having a Saybolt Universal viscosity above about 60 seconds at 100° F., for example, about 80 seconds at 100° F. to about 500 seconds at 210° F., although oils of lower or higher viscosity can also be used. The oil can be a petroleum distillate or residuum or a synthetic hydrocarbon oil or mixtures of such oils.

The following example is given to illustrate one method of preparing the graft copolymers of our invention and is not intended to limit the scope thereof.

EXAMPLE I

A copolymer of isobutylene and p-isopropyl-α-methylstyrene was prepared using a molar ratio of alkene:styrene of 10:1. The polymerization was carried out in cyclopentane solution at −50° F. for about ½ hour using a slurry of $AlCl_3$ in methyl chloride as catalyst. The copolymer thus formed had a molecular weight of about 25,000. The hydroperoxide of this copolymer was formed by gently blowing a solution of the copolymer in benzene with air at about 120 to 140° F. for about 8 hours, in the presence of cumene hydroperoxide. The copolymer hydroperoxide was precipitated by pouring the benzene solution into methanol and remaining impurities were removed by several leachings with hot methanol.

The graft polymerization of octyl acrylate onto the copolymer so made was carried out in an emulsion having the following composition:

| | | |
|---|---|---|
| $H_2O$ | liter | 1 |
| Sodium stearate | grams | 50 |
| Sodium pyrophosphate | do | 50 |
| Hydroperoxide of copolymer of isobutylene and p-isopropyl-α-methylstyrene (dissolved in benzene) | do | 125 |
| $FeSO_4 \cdot 7H_2O$ | do | 2 |
| Octyl acrylate | ml | 150 |

The above mixture was emulsified with vigorous stirring and the polymerization carried out for about 8 hours at about 100° F. under an atmosphere of nitrogen. The emulsion was broken with a mineral acid and hexane was added to dissolve the graft copolymer. Impurities were removed by washing the hexane solution with aqueous methanol followed by precipitation of the graft copolymer into and leaching with methanol. After drying in a vacuum oven at 200° F. the product was a clear, highly viscous, tacky, semi-solid.

Other graft copolymers in which octyl acrylate, lauryl methacrylate, butoxyethyl acrylate and acrylonitrile were used as the graft monomer were made in a similar manner.

The effectiveness of the graft copolymers of this invention in improving the V.I. of hydrocarbon oils is demonstrated by the data in Table I. The graft copolymers can be used alone in hydrocarbon oils, or if desired, can be employed in combination with other additives, for example, pourpoint depressors, detergent-type additives, corrosion inhibitors, antioxidants, sludge inhibitors, metal deactivators, E.P. agents, etc.

Table I

| Graft Copolymer [1] | Graft Monomer | Weight Percent Graft Copolymer In 5W Base Oil | Viscosity, S.S.U. 100° F. | Viscosity, S.S.U. 210° F. | V.I. |
|---|---|---|---|---|---|
| A | Octyl Acrylate | 0 | 93.0 | 38.5 | 90 |
| | | 1 | 119.0 | 42.6 | 139 |
| | | 2 | 149.5 | 46.6 | 148 |
| | | 3 | 191.4 | 52.6 | 151 |
| B | Lauryl Methacrylate | 1 | 108.9 | 40.7 | 119 |
| | | 2 | 126.3 | 43.2 | 137 |
| | | 3 | 147.2 | 45.8 | 143 |
| C | Butoxyethyl Acrylate | 1 | 112.9 | 41.4 | 127 |
| | | 2 | 137.0 | 44.4 | 138 |
| | | 3 | 165.9 | 48.5 | 148 |
| D | Acrylonitrile | 1 | 113.0 | 41.0 | 116 |
| | | 2 | 135.3 | 43.9 | 134 |
| | | 3 | 165.5 | 47.9 | 144 |

[1] Isobutylene, p-isopropyl-α-methylstyrene and graft monomer in molar ratio of about 5:1:2.

The alkene-styrene copolymers which are used in forming the graft copolymers of this invention have, as might be expected, viscosity index improving properties in themselves. The data of Table II illustrate the improvement in these properties which results from the grafting of the acrylic monomers thereon. Table II shows the effectiveness as V.I. improvers of certain isobutylene/p-isopropyl-α-methyl styrene copolymers, both before and after graft polymerization with octyl acrylate.

Table II

| Molar Ratio: Alkene/Styrene in "Backbone" Copolymer [1] | Weight Percent "Backbone" Copolymer in 5W Base Oil | V.I. | Graft Monomer | Weight Percent Graft Copolymer in 5W Base Oil | V.I. |
|---|---|---|---|---|---|
| 5:1 | 1 | 117 | Octyl Acrylate | 1 | 139 |
| | 2 | 133 | | 2 | 148 |
| | 3 | 133 | | 3 | 151 |
| 10:1 | 1 | 122 | do | 1 | 140 |
| | 2 | 134 | | 2 | 151 |
| | 3 | 140 | | 3 | 152 |
| 20:1 | 1 | 117 | do | 1 | 139 |
| | 2 | 133 | | 2 | 146 |
| | 3 | 138 | | 3 | 147 |

[1] Copolymer of isobutylene and p-isopropyl-α-methylstyrene.

While we have described our invention by reference to certain specific embodiments thereof, these have been given by way of illustration only and the invention should not be limited thereto, but includes within its scope such modifications and variations as come within the spirit of the appended claims.

Having described our invention, we claim:

1. A lubricant composition comprising a major proportion of a hydrocarbon lubricating oil and a small proportion, sufficient to improve the viscosity index of said hydrogen lubricating oil, of a graft copolymer product prepared by polmerizing a mixture of an ethylenically substituted aromatic compound selected from the group consisting of styrene, isopropyl styrene and isopropyl-α-methyl styrene, and an alkene selected from the group consisting of propylene and isobutylene, to form a backbone copolymer of said aromatic compound and said alkene having a molar ratio of said aromatic compound to said alkene of from about 1:1 to about 1:50 and a molecular weight within the range of from about 5,000 to about 75,000, hydroperoxidizing said backbone copolymer, and reacting the hydroperoxidized backbone copolymer with an acrylic monomer having the general formula $$CH_2{=}\overset{R}{\underset{|}{C}}{-}Z$$

wherein R is selected from the group consisting of hydrogen and a methyl radical and Z is selected from the group consisting of a cyano radical and an alkyl carboxy radical having the structure

wherein R' is selected from the group consisting of an alkyl radical having at least about 4 carbon atoms and a β-alkoxyalkyl radical having at least about 6 carbon atoms, to form a graft copolymer product having a molar ratio of said acrylic monomer to said substituted aromatic compound to said alkene within the range of from about 1:1:1 to about 50:1:50, and having a molecular weight in the range of from about 20,000 to about 150,000.

2. The lubricant composition of claim 1 in which the acrylic monomer is acrylonitrile.

3. The lubricant composition of claim 1 in which the acrylic monomer is an alkyl acrylate having from about 4 to about 18 carbon atoms in the alkyl group.

4. The lubricant composition of claim 1 in which the acrylic monomer is an alkyl methacrylate having from about 4 to about 18 carbon atoms in the alkyl group.

5. The lubricant composition of claim 1 in which the acrylic monomer is an alkoxyethyl ester of acrylic acid having from about 4 to about 18 carbon atoms in the alkoxy group.

6. A lubricant composition comprising a major portion of a hydrocarbon lubricating oil and from about 0.1 to about 20% by weight of a graft copolymer product prepared by polymerizing a mixture of p-isopropyl-α-methylstyrene and isobutylene to form a backbone copolymer of p-isopropyl-α-methylstyrene and isobutylene having a molar ratio of p-isopropyl-α-methylstyrene to isobutylene within the range of from about 1:5 to about 1:25 and a molecular weight within the range of from about 15,000 to 50,000, hydroperoxidizing the resulting backbone copolymer, and reacting the hydroperoxidized backbone copolymer in the presence of a reducing agent with an acrylic monomer having the general formula

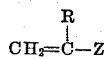

wherein R is selected from the group consisting of hydrogen and a methyl radical and Z is selected from the group consisting of a cyano radical and an alkyl carboxy radical having the structure

wherein R' is selected from the group consisting of an alkyl radical having from about 8 to about 12 carbon atoms and a β-alkoxyalkyl radical having a total of about 10 to about 26 carbon atoms, to form a graft copolymer product having a molar ratio of acrylic monomer to p-isopropyl-α-methylstyrene to isobutylene within the range of from about 1:1:5 to about 25:1:25 and having a molecular weight in the range of from about 40,000 to 70,000.

7. The lubricant composition of claim 6 in which said acrylic monomer is acrylonitrile.

8. The lubricant composition of claim 6 in which the acrylic monomer is octyl acrylate.

9. The lubricant composition of claim 6 in which the acrylic monomer is lauryl methacrylate.

10. The lubricant composition of claim 6 in which the acrylic monomer is butoxyethyl acrylate.

11. The method of improving the viscosity index of a hydrocarbon lubricating oil which comprises adding to said oil from about 0.1 to about 20 weight percent of a graft copolymer product prepared by polymerizing a mixture of an ethylenically substituted aromatic compound selected from the group consisting of styrene, isopropyl styrene and isopropyl-α-methylstyrene and an alkene selected from the group consisting of propylene and isobutylene to form a backbone copolymer of said aromatic compound and said alkene having a molar ratio of said alkene to said aromatic compound in the range of from about 5:1 to about 25:1 and a molecular weight within the range of from about 15,000 to 50,000, hydroperoxidizing the backbone copolymer and reacting the hydroperoxidized backbone copolymer in the presence of a reducing agent with an acrylic monomer having the general formula

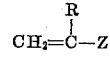

wherein R is selected from the group consisting of hydrogen and a methyl radical and Z is selected from the group consisting of a cyano radical and an alkyl carboxy radical having the structure

wherein R' is selected from the group consisting of an alkyl radical having from about 8 to about 12 carbon atoms and a β-alkoxyalkyl radical having a total of about 10 to about 26 carbon atoms, to form a graft copolymer product having a molar ratio of said acrylic monomer to said aromatic compound to said alkene within the range of from about 1:1:5 to about 25:1:25 and having a molecular weight in the range of from about 40,000 to 70,000.

References Cited in the file of this patent

UNITED STATES PATENTS

| | | |
|---|---|---|
| 2,366,517 | Gleason | Jan. 2, 1945 |
| 2,572,557 | Butler | Oct. 23, 1951 |
| 2,610,962 | Smyers | Sept. 16, 1952 |
| 2,837,496 | Vandenberg | June 3, 1958 |

FOREIGN PATENTS

| | | |
|---|---|---|
| 161,292 | Australia | Feb. 21, 1955 |

OTHER REFERENCES

"Journal of Polymer Science," 1955, vol. XVI, pages 345–355.